(No Model.) 2 Sheets—Sheet 1.
G. YOUNG & W. CRIPPEN.
APPARATUS FOR DYEING, &c.
No. 496,082. Patented Apr. 25, 1893.
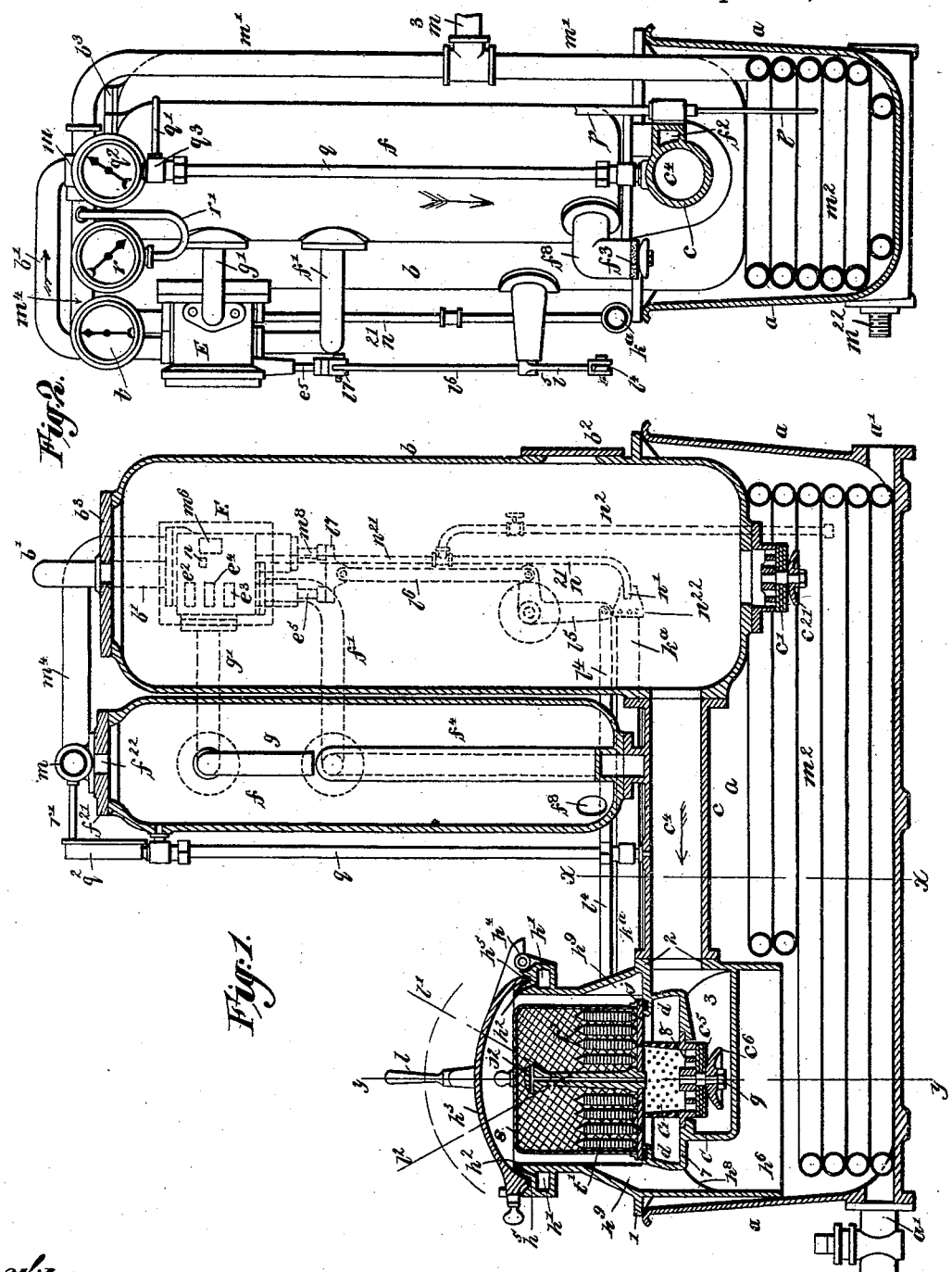
Witnesses:
H. S. Dieterich
B. W. Sommers
Inventor:
George Young & William Crippin.
By Henry Orth
Atty:

(No Model.) 2 Sheets—Sheet 2.
G. YOUNG & W. CRIPPEN.
APPARATUS FOR DYEING, &c.
No. 496,082. Patented Apr. 25, 1893.
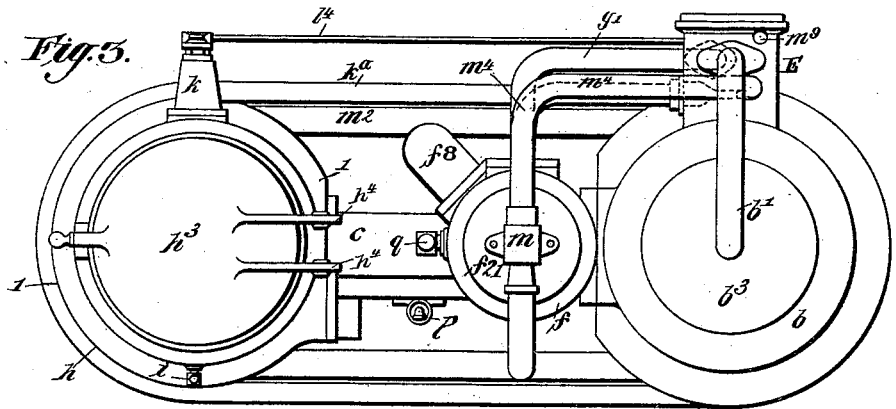
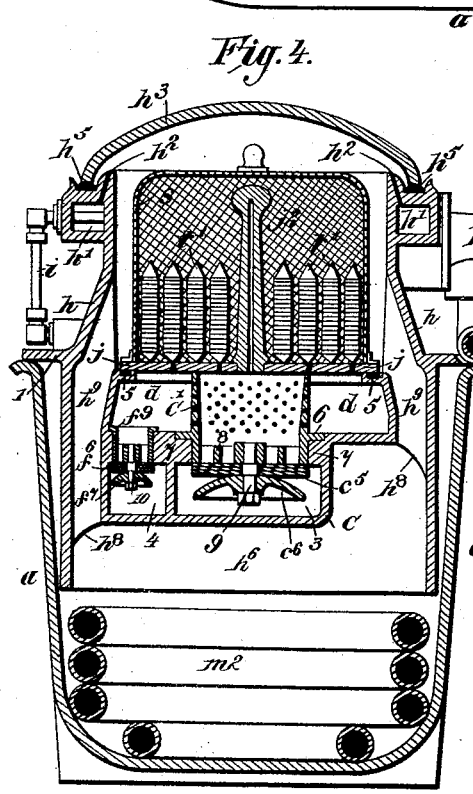
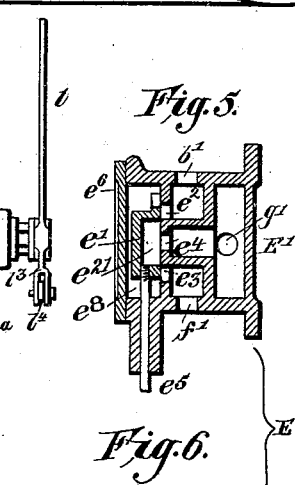
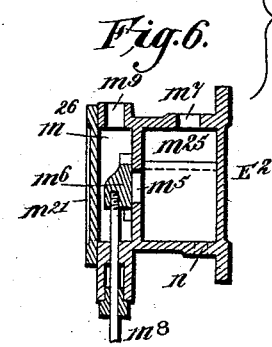
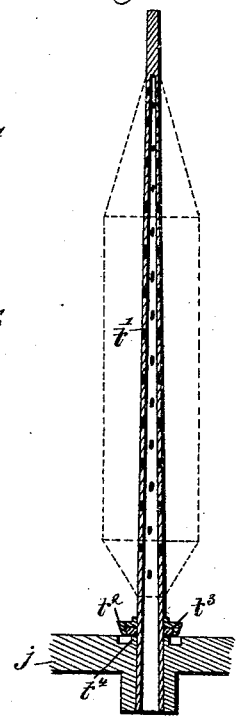
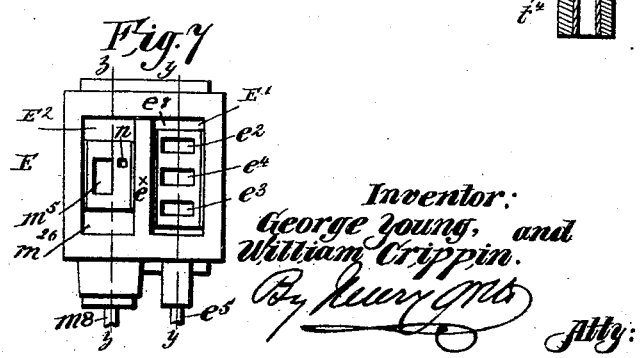
Witnesses:
H. S. Dieterich
B. W. Sommers
Inventor:
George Young, and
William Crippin.
Atty.
THE NORRIS PETERS CO., PHOTO-LITHO., WASHINGTON, D. C.

UNITED STATES PATENT OFFICE.

GEORGE YOUNG, OF WINTON, AND WILLIAM CRIPPIN, OF PATRICROFT, ENGLAND.

APPARATUS FOR DYEING, &c.

SPECIFICATION forming part of Letters Patent No. 496,082, dated April 25, 1893.

Application filed April 22, 1892. Serial No. 430,257. (No model.) Patented in England March 19, 1891, No. 4,928, and October 28, 1891, No. 18,588.

*To all whom it may concern:*

Be it known that we, GEORGE YOUNG, residing at Winton, near Manchester, and WILLIAM CRIPPIN, residing at Patricroft, near Manchester, in the county of Lancaster, England, subjects of the Queen of Great Britain, have invented certain new and useful Improvements in Apparatus for Dyeing and Bleaching or Otherwise Treating Fibrous Materials, (for which we have obtained patents in England numbered 4,928 and 18,588, dated, respectively, March 19, 1891, and October 28, 1891;) and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus for dyeing, bleaching, or otherwise treating fibrous materials in the raw or in the manufactured or partly manufactured state, and it has for its object certain improvements whereby the above recited treatment of fibrous materials may be carried out more effectually and more economically than is usually the case, as well as automatically.

The invention consists more especially in certain improvements on machines or apparatus of the class described and shown in Letters Patent of the United States to George Young, one of the parties hereto, and one Frank Pearn, No. 479,383, patented July 19, 1892, and particularly in the use of an ejector instead of a pump, for producing a partial vacuum in the treating chamber to cause a liquid or a gas or air or steam or air and steam to be drawn into said chamber and through the material being treated, and in means for utilizing the waste steam from the ejector.

The invention consists further in improved means for passing the gas, air, or steam, or air and steam, into the treating chamber, and in valve mechanism for controlling this operation; and the invention also consists in novel features of construction and combinations of co-operative elements as will now be fully described, reference being had to the accompanying drawings, in which—

Figure 1 is a longitudinal vertical sectional elevation of a machine or apparatus embodying our invention. Fig. 2 is a section taken about on line $x$—$x$ of Fig. 1, looking toward the right. Fig. 3 is a plan view in which some of the minor parts are omitted, as the pressure gages and indicator. Fig. 4 is a section taken on line $y$—$y$ of Fig. 1. Figs. 5 and 6 are sections taken on lines $y$—$y$, and $z$—$z$ respectively, of Fig. 7, which is an elevation of the slide valve chest with the covers and slide valves removed, and Fig. 8 is a vertical section of a cop skewer or spindle and a portion of the supporting table illustrating improved means for connecting the skewer fluid tight with its support.

Similar symbols indicate like parts wherever such may occur in the several figures of drawings just described.

The apparatus comprises a vat, $a$, a treating chamber, $h$, two receiving chambers of unequal capacities, $b$, and $f$, and hereinafter called the large and small receivers, an ejector, $m$, for exhausting the air from the receivers and the treating chamber, means for admitting a gas, or air, or steam, or air and steam to the treating chamber, suitable valve mechanism for controlling the exhaust of the air from the receivers, and treating chamber; means for utilizing the waste steam from the ejector, and suitable pressure, temperature, and other indicators.

All those parts of the apparatus that come in contact with the liquor used, we preferably construct of a suitable metal, the surfaces in contact with such liquor being provided with a coating of a suitable enamel, though the essential parts of the apparatus may be constructed of wood, as for instance, the vat and the receivers.

The vat, $a$, is provided at one or both ends as may be found most desirable, with a valved exhaust branch, $a'$, and within the vat is arranged a heater coil, $m^2$, that has its exhaust at $m^{22}$, Fig. 2, said coil being preferably arranged as close as possible to the walls of the vat so as not to interfere with the stirring of the liquid therein where this is necessary, and to facilitate the cleansing of said vat.

The treating chamber, $h$, is provided with an encompassing flange, $l$, for supporting the same on the vat, $a$, and centrally within the chamber, $h$, is arranged an exhaust chamber or valve casing, C, that is preferably cast in one piece with the chamber and connected therewith by webs, $h^8$, between which passages, $h^9$, are formed for liquid to ascend into the upper part of the said treating chamber above the exhaust chamber, C, said treating chamber having an extension, $h^6$, projecting into vat, $a$. The upper end of the treating chamber is closed by a lid, $h^3$, pivoted to the chamber at $h^4$, and in order to form a tight joint between the lid and chamber the former has an annular flange that is substantially V-shaped in section and fitting in a like recess or groove in the upper face of the chamber, $h$, in the bottom or apex of which groove is placed a packing, $h^5$, as for instance a rubber gasket, thus forming a channel for the reception of liquid to form a luting or liquid seal in addition to the packed joint, so that a perfectly fluid tight joint is obtained. Around the upper portion of the treating chamber, $h$, is formed a duct or passage, $h'$, in communication with the interior of said chamber, through passages, $h^2$, leading from the duct, $h'$, to the upper inner edge of the chamber, as shown in Figs. 1 and 4. Although we prefer the described arrangement of passages, $h^2$, for the reason that the air or steam or the combined air and steam are directed upwardly toward the cover, $h^3$, yet if desired the communication between the duct, $h'$, and chamber, $h$, may be established through ports or passages radiating from said duct.

The exhaust chamber, C, has a cavity or chamber, $d$, formed in its upper end which is encompassed by an inwardly projecting flange, grooved to receive a packing, 5, said flange serving as a support for a circular table, $j$, that supports the material to be treated, said packing, 5, forming a fluid tight joint between the casing, C, and table, which table has a tubular handle, $j^2$, opening into cavity or chamber, $d$, and into treating chamber, $h$, above the highest possible level of liquid therein.

In the floor, 7, of the cavity, $d$, are formed two openings, one of which is formed in the center of said bottom or floor, 7, and is of greater diameter than the other opening. These openings serve as bearings for the supports and seats of two, flexible check valves, $c^5$, $f^6$, and communicate with two passages, 3, and 4, Fig. 4 respectively, the outlets of which have a coupling flange, 2, for the coupling thereto of a casting, $c$, having formed therein two passages, $c^4$, and $f^2$, that communicate respectively with the passages, 3 and 4, below the check or exhaust valves $c^5$, and $f^6$. These exhaust valves it will be observed, are removably seated in their bearings in the floor 7, of cavity or chamber, $d$; the check valve, $c^5$, is secured to the lower end of a tubular casting, C', that has an encompassing flange, 6, Fig. 4 that fits into a corresponding rabbet formed around the upper edge of the central opening in the floor, 7, of the cavity or chamber, $d$, that portion of the tubular casting, C', above said flange, 6, serving as a central support for the table, $j$, and is perforated or slotted so as to admit the liquid entering said cavity through the material and its supports into casting, C'. The lower end of the casting or valve support, C' has a grating, 8, Figs. 1 and 4, in which is formed a central bearing for the valve stem, 9, to which the flexible check or exhaust valve, $c^5$, and a concavo-convex stop disk, $c^6$, are secured, said disk being arranged below the valve and serving to limit its movement from its seat formed by the lower end of the support, C'. The support, $f^9$, of exhaust valve, $f^6$, is also tubular and has an encompassing flange at its upper end, seating on the floor or partition, 7, of the exhaust valve chamber, C, as shown in Fig. 4. These exhaust valves may be readily set in their bearings or removed therefrom through the chamber, $d$, when the table, $j$, is removed. The ducts, $c^4$, $f^2$, in the casting, $c$, are respectively connected with the lower ends of the large and small receivers, the duct, $f^2$, communicating with a duct, $f^4$, in small receiver, $f$, which duct extends upwardly some distance along the inner wall of said small receiver and opens outwardly and is connected by a pipe, $f'$, with one of the ports in a slide valve chest E, hereinafter to be described. The ports for the exhaust valves, $c^5$, $f^6$, and their passages and ducts leading respectively into the large receiver, $b$, and through the small receiver, $f$, to the valve chest, E, are somewhat proportionate to the capacity of the said receivers; the large receiver, $b$, is of sufficient capacity to hold the required quantity of liquid to be exhausted from vat, $a$, at one time through the material being treated; air or steam, or air and steam, and but very little liquid, comparatively speaking, enters the small receiver and its connections, so that the valve, $c^5$, may be termed the liquid exhaust valve, and the valve, $f^6$, the fluid exhaust valve. The pipe, $k^a$, Fig. 2 connected with passage, $h'$, encompassing the upper end of the receiving chamber, $h$, is or may be open at its outer end, a steam nozzle, $n'$, of a pipe, $n^{21}$, projecting into said open end so that when steam is injected air will be entrained therewith, said pipe, $n^{21}$, being connected with a steam port in the slide valve chest, E. The end of pipe, $k^a$, may, however, fit steam tight or approximately so around the nozzle, $n'$, and perforations, $n^{22}$, may be formed in the enlarged portion of the pipe end for the admission of air, and suitable means provided to close said perforations or ports when it is desired to inject steam only into the said pipe, while if air alone is to be admitted to pipe, $k^a$, the communication between pipe, $n^{21}$, and the steam port in the valve chest, E, is cut off by means of a suitable stop cock in said pipe, not shown. As shown in dotted lines in Fig. 1, the pipe, $n^{21}$, has a valved branch, $n^2$, that extends into vat, $a$, for the admission of steam into the liquid therein for the purpose of heating the same. The fluids, steam or air, or steam and air, or a gas, admitted through pipe, $k^a$, to passage, $h'$, are controlled by a cock or valve, $k$, Figs. 3 and 4, and hereinafter more fully referred to.

The large receiver, $b$, is open at both ends and has a man hole closed by a cover, $b^2$. The opening at the lower end of said receiver is normally closed by a flexible check valve, $c'$, Fig. 1, of substantially the same construction as the exhaust valves, $c^5$, $f^6$, the valve casing or support being bolted to a suitable flange formed around said lower opening. The opening at the upper end of the large receiver is closed by a cap plate, $b^3$, to which is connected a pipe, $b'$, leading to one of the air ports in the valve chest, E, Figs. 1, 2 and 3. The small receiver, $f$, is open at top, the opening being closed by a cap plate, $f^{21}$, having formed therein a central port, $f^{22}$, leading to the air chamber of an ejector, $m$, arranged immediately above said small receiver, $f$, which is provided near its bottom with a pipe, $f^8$, adapted to discharge into vat, $a$, the discharge orifice of which pipe is normally closed by a check valve, $f^3$, also of substantially the same construction as the valves, $c'$, $c^5$, and $f^6$.

The ejector, $m$, is of that well known form or class in which the steam passes axially through the ejector casing, and the air or other fluid through a passage surrounding the steam passage or nozzle, or vice versa, and we have deemed it unnecessary to show said ejector in detail. The steam is supplied to the ejector through pipe, $m^4$, connected with a port in the valve chest, E, the waste steam and air passing through a pipe, $m'$, that is connected with the heater coil, $m^2$, in vat, $a$, so that the liquid therein may be heated either by injecting steam through branch, $n^2$, of pipe, $n^{21}$, or by the waste steam from the ejector, or both. The pipe, $m'$, has a branch, $m^3$, through which the waste steam and air from the ejector may be carried to any suitable point for use, as for instance, to a heater coil in a drying chamber, wherein the material treated in the apparatus is or may be dried. As more or less of the steam is condensed during its passage through the pipes and heater coils, we collect the water of condensation which we utilize in the preparation of dye baths or solutions, whereby the distilled water (or water of uniform quality) necessary to the preparation of said solutions is obtained, a considerable economy being effected in view of the fact that naturally pure water is seldom to be obtained and that pure water is necessary in the preparation of dye solutions to obtain satisfactory uniform shades. The waste steam and water of condensation escape from the heater coil, $m^2$, at $m^{22}$ Fig. 2, though these may be conducted to the chambers for drying the materials which have been treated.

Referring now to Figs. 5, 6, and 7, the slide valve chest, E, is divided by a partition, $e^x$, Fig. 7, into two chests, E', and E². The latter being the steam chest has a port, $m^5$, and near thereto a small port, $n$, faced for a slide valve $m^6$, that is adapted to cover said ports when in its middle position and to cover the port, $n$, only when at the limit of its stroke in one direction, namely in an upward direction, in this case the valve chest, E, being secured to the side of the large receiver with the ports in a vertical line. The valve works in a steam tight chamber, $m^{26}$, supplied with live steam through a port, $m^9$, Figs. 3 and 6, connected with a steam generator by a suitable valved pipe not shown, the valve, $m^6$, being held to its seat by the pressure in chamber, $m^{26}$. The valve stem, $m^8$, for valve, $m^6$, works steam tight in a suitable stuffing box. The steam port, $m^5$, is connected through passage, $m^{25}$, with pipe, $m^4$, that supplies steam to the ejector, and said pipe, $m^4$, is connected by a pipe, $r'$, with a suitable pressure gage, $r$, see Fig. 2, so as to indicate the pressure of the steam supplied to the ejector, $m$. The small port, $n$, Fig. 7, is connected through a suitable passage in the steam valve chest with the pipe, $n^{21}$, that supplies steam to the injector, $n'$, above referred to.

The valve chest, E', may be termed the air valve chest, and is provided with a valve chamber, $e^8$, in which works a slide valve, $e'$, the construction of which is similar to the ordinary steam slide valve and like it covers three ports, $e^2$, $e^4$, $e^3$, but when in its middle position as shown in Fig. 5, the valve has not "lap" or length sufficient to cover both outside ports, $e^2$, $e^3$, so that air which has free access to valve chamber, $e^8$, through the bearings for the valve stem, $e^5$, and through a port or ports in the cover, $e^6$, can pass through said outside ports. The port, $e^2$, is connected by pipe, $b'$, with the upper end of the large receiver, $b$, the port, $e^3$, is connected by pipe, $f'$, with the passages, $f^4$, $f^2$, within the small receiver, $f$, and the casting, $c$, respectively, and with the passage, 3, below the air exhaust valve, $f^6$, while the central port, $e^4$, is connected by pipe, $g'$, with the pipe, $g$, extending downwardly into the small receiver, $f$.

As shown in Fig. 5, the slide valve, $e'$, has a cavity $e^{21}$, similar to the exhaust cavity of the ordinary steam engine slide valve, so that communication may be established therethrough between either port, $e^2$, or $e^3$, with the port, $e^4$, for purposes presently to be described.

Any suitable means may be provided for operating or manipulating the slide valves, $e'$, and $m^6$, and the cock or valve, $k$. We prefer, however, to operate them simultaneously through the medium of the following instrumentalities.

The valve, $k$, has a handle lever, $l$, adapted to be moved into three different positions: In one position, $l^2$, the valve is entirely closed; in the middle or normal position it is slightly open to admit air to the treating chamber, $h$, and in the other position, $l'$, it is fully open to admit air, gas, steam, or steam and air from the pipe, $k^a$, to the passage, $h'$, and treating chamber, $h$. The handle lever, $l$, is a two-armed lever whose arm, $l^3$, is connected by a rod, $l^4$, to the vertical arm of a bell-crank lever, $l^5$, that has its fulcrum on a bracket secured to the large receiver, $b$. The horizontal arm of the bell crank lever, $l^5$, is pivotally connected to one end of a vertical actuating rod, $l^6$, whose other end is pivoted to a cross head, $l^7$, to which are connected the stems, $e^5$, and $m^8$, of the slide valves, $e'$, and $m^6$, respectively, as shown in dotted lines in Fig. 1, so that both valves are moved simultaneously with the cock or valve, $k$, the various operations or round of operations being thus controlled by a single hand lever, $l$. These operations may consist in drawing the liquid from the vat, $a$, repeatedly through the material being treated, or in alternately, or alternately and repeatedly drawing liquid and steam, or air, or steam and air, or a gas, through said material, each series of operations constituting what may be termed a round of such, and these we will now describe. When the lever, $l$, is in its middle position the cock or valve, $k$, and the slide valves, $e'$, and $m^6$, are in a like position, communication between $h'$, and $k^a$, being established, air passing freely into the chamber, $h$, and from valve chamber $e^8$, through port, $e^2$, and pipe, $b'$, into large receiver, $b$, and passages, $c^4$, 3; the valve, $c'$, is then open and $c^5$, is closed; air also passes freely from said valve chamber through port, $e^3$, pipe, $f'$, and passages $f^4$, $f^2$, 4. The valve, $f^6$, being also closed, steam is also cut off from the ejector, $m$, while air has free access to small receiver, $f$, through the pipe, $m'$, and the annular air space of said ejector. If lever, $l$, is now moved to $l^2$, the slide valve or cock, $k$, will be closed entirely. The steam slide valve, $m^6$, as well as the air slide valve, $e'$, are moved to one extreme of their stroke in an upward direction, the steam port, $m^5$, in valve chest, $E^2$, being uncovered, allowing steam to pass from valve chamber, $m^{26}$, through port, $m^5$, passage, $m^{25}$, to pipe, $m^4$, and ejector, $m$, starting the latter. At the same time the air slide valve, $e'$, will establish communication between the small and large receivers, $f$, and $b$, respectively, through the former receiver by pipes, $g$, $g'$, port, $e^4$, in air valve chest, E', cavity, $e^{21}$, of valve, $e'$, port, $e^2$, and pipe, $b'$, connected with large receiver, and through the latter communication is established with passages, $c^4$, and 3, causing valve, $c^5$, to open, and through the port of said valve, the valve support, C', table, $j$, its tubular handle, the material being treated, and its tubular supports opening into chamber, $d$, with the treating chamber, $h$, the air therein being exhausted through said handle, and the material and its supports, into the cavity or chamber, $d$, of exhaust casing, C, therein, through port of valve, $c^5$, to passages, 3, $c^4$, into large receiver, $b$, through pipe, $b'$, port $e^2$, in air valve chest, E', to cavity $e^{21}$, of valve, $e'$, and thence through port, $e^4$, and pipes, $g'$, $g$, into small receiver $f$, and from the latter to ejector, $m$, pipe, $m'$, and coil, $m^2$, or to pipe, $m^3$, or both. The formation of a partial vacuum within the treating chamber, $h$, causes the liquor in the vat to rise into said treating chamber, $h$, and following the exhausted air to pass through the material to the large receiver, $b$, and when a sufficient quantity of the liquor has been drawn through the material the operation is stopped. The lever, $l$, may now be returned to its middle or vertical position, thereby returning the valves, $k$, $e'$, and $m^6$, to their normal positions cutting off the supply of steam to the ejector, and admitting air to the treating chamber, $h$, and the large receiver, $b$, through port, $e^2$, and pipe, $b'$, destroying the partial vacuum therein and causing the valve, $c'$, to open under pressure of the liquor in said receiver and be discharged therefrom and from the connections with the exhaust valve casing, C, into vat, $a$, the valve, $c^5$, previously returning to its seat. It will be observed that while the air is being exhausted from the treating chamber, $h$, and the liquid is drawn from the vat therethrough and through the material air flows freely through port, $e^3$, in the air-valve chest, and thence to pipe, $f'$ passages $f^4$, $f^2$, and 4, below check valve, $f^6$, which therefore remains on its seat. If, after subjecting the material being treated to the action of the liquid in the vat, it is desired to subject the same to the action of steam or steam and air, the lever, $l$, is moved from $l^2$, to $l'$, with the following results: The cock or valve, $k$, is opened, establishing communication between the treating chamber, $h$, and pipe, $k^a$, through the annular passage, $h'$, at the upper end of said chamber, both slide valves, $e'$, and $m^6$, moving downward to the limit of their stroke, the steam port to the ejector remaining uncovered except during the short time it takes the valve, $m^6$, to move across said port. The port, $e^2$, in air valve chest, E', being uncovered, air is admitted to the large receiver the partial vacuum therein being destroyed, causing valve, $c'$, to open and valve, $c^5$, to close, the liquid in large receiver, $b$, and its connections with the valve casing, C, being discharged into the vat, $a$, a partial vacuum being maintained in the small receiver by the ejector, as no air can enter the same. This downward movement of the slide valve, $e'$, establishes communication between the interior of the small receiver and the pipe, $f'$, passages, $f^4$, $f^2$, and 4, the latter below exhaust valve, $f^6$, through the center port, $e^4$, the cavity, $e^{21}$, of valve, $e'$, and the lower port, $e^3$, a partial vacuum being produced in said passages, 4, $f^2$, $f^4$, and pipe, $f'$, causing valve, $f^6$ to open and a partial vacuum to be produced in the treating chamber, $h$. At the same time the valve, $m^6$, uncovers the small steam port, $n$, admitting steam to pipe, $n^{21}$, injector, $n'$, thence to $k^a$, $h'$, steam or air or both being now drawn through $k^a$, $k$, $h'$, $h^2$, into $h$, thence through the material being treated and its support into chamber, $d$, through port or valve, $f^6$, into passages, 3, $f^2$, $f^4$, pipe, $f'$, port, $e^3$, cavity, $e^{21}$, of valve, $e'$, port, $e^4$, and pipes, $g'$, $g$, into small receiver, thence to ejector, $m$, and pipe, $m'$.

As before stated and as shown in Fig. 1, the pipe, $g$, extends downwardly into the small receiver, $f$, so that any spray or liquid passing therethrough will be driven downwardly and collect in the small receiver, and is thus prevented from passing to the ejector, $m$. If the lever, $l$, is now shifted to its normal or middle position, air enters the small receiver, $f$, and any liquid collected therein flows back to vat, $a$, through check valve, $f^3$.

An important feature of this invention lies in the provision of means for exhausting the fluids in the large receiver $b$, through the small receiver, $f$, which results in a saving of the liquid used, some of which would pass to the ejector, $m$, if a direct connection were made between the same and the receiver, $b$, or if a separate ejector were used for this purpose, and when the apparatus is used for dyeing fibrous materials the saving in the dye liquor is considerable.

The cops to be treated are carried on a plate or table, $j$, hereinabove referred to.

In order to form a tight joint between the tubular perforated or slotted skewers, $t'$, and their seat or bearing in the table, $j$, we preferably form an annular recess around the said bearing or seat in the upper face of the table, so as to form a raised seat, $t^4$, for the packing, $t^3$, which is contained in a dove-tailed recess formed in the under face of a packing disk, $t^2$, said packing, $t^3$, consisting of a dovetailed block of rubber. Although we prefer, as stated, to form a raised seat for the packing, $t^3$, this is not absolutely necessary, but we find that by this means a better joint is obtained, while the packing, $t^3$, is securely held in the dovetailed recess of the disk, $t^2$, that is mounted on the skewer and can therefore not drop off, and become misplaced or lost when the skewers are removed. The seating for the packing may be formed by a boss projecting above the face of the table, $j$, and the lower end of the skewers may be made to taper slightly to facilitate the seating of them in their bearings. In order to provide a sufficiently extended bearing for the cops or skewers we form a boss on the under side of the table $j$ around the perforations therein, as shown in said Fig. 8.

As shown in Fig. 4, the treating chamber, $h$, is provided with a level indicator, $i$, similar to those used on steam boilers, to indicate when there is liquid in the treating chamber. A thermometer, $p$, Figs. 2 and 3, is supported in a projection from the casting, $c$, its lower end dipping into the vat, $a$, so that the temperature of the liquid therein may be ascertained. A glass tube, $q$, is carried in a bracket on the casting, $c$, and communicates with the passage, $c^4$, therein. The upper end of said tube is supported by a bracket, $q^3$, at the upper end of the small receiver, $f$, and is connected by a pipe, $q'$, with the upper end of the large receiver, $b$, and in said bracket is formed a passage that is connected with a pressure gage, $q^2$, Fig. 2 and with the small receiver, $f$, indicating pressures below atmospheric pressures. When liquid is being drawn from the treating chamber, $h$, into large receiver, $b$, the passage, $c^4$, in casting, $c$, is full of such liquid, and as it rises in said receiver it also rises in the tube, $q$, so that the quantity of liquid drawn into the receiver can be ascertained, and in order that the operation of drawing liquid into the receiver may be stopped in proper time the tube, $q$, is provided with a level mark, or an index hand may be arranged by the side of the tube for the same purpose, and said index may be made adjustable on its support, so that variable quantities of liquor may be drawn into the receiver, $b$, according to the nature of the material treated and the nature of the treatment to which such material is subjected. If desired the tube, $q$, may communicate at its upper end both with the pressure gage and small receiver, $f$, instead of with the large receiver, $b$. In this case it will, however, be necessary to provide a small lifting valve in the bracket for the upper end of the tube, $q$, so arranged as to lift and close the passage between said tube and small receiver $f$, when a sufficient current ascends the tube, as will be the case when atmospheric air is admitted into the large receiver, $b$, while the small receiver is being exhausted.

As hereinabove stated the material to be treated may be subjected to a series of operations constituting one round of such, which operations are automatically carried on by simply shifting the lever, $l$, from one position to another, as explained hereinbefore, and in order to prevent errors through neglect or forgetfulness of the operator, as to the completion of a round or rounds of operations, we provide suitable indicators operated automatically. This may be effected by providing the air valve, $e'$, with a second stem extending through the upper end or side of the valve chest, $E'$, said stem being connected with or operating an arm adapted to rock on the arbor of a ratchet wheel, said arm having a pawl pivoted thereto engaging and revolving the ratchet in such manner that a complete reciprocation of the valve, $e'$, will revolve the ratchet a distance equal to the space between two teeth, a retaining pawl being provided to prevent the backward rotation of said ratchet. The axis of the ratchet may have a hand secured thereto traveling over a suitable dial, or the said axis may be geared up by toothed wheels with the spindle of a hand traveling over a suitably graduated dial, $t$, Fig. 2. The gearing, if any be used, is such that whatever number of completed operations there may be to the round, the hand after each round of operations will return to the zero graduation or starting point of the dial, change wheels being used according to the number of such operations to the round. This indicating mechanism, may if desired be geared up with another indicator or recorder in such manner as to indicate each round of operations only to record the number of tables of cops or other material which have been treated.

When the apparatus is used for indigo dyeing the dye liquor from the small receiver is not allowed to flow back into vat, $a$, but is conducted into a separate vessel from which it is pumped into a separate compartment or receptacle wherein it is treated in a well known manner for the purpose of reviving its dyeing properties, when it is returned to the vat, $a$.

In dyeing with some dyes we prefer to filter the dye liquor before passing it through the material in the treating chamber, $h$. To this end we employ a filter casing, $s$, of wire gauze covered exteriorly with filtering cloth and adapted to be placed over the material on table, $j$, as shown in Figs. 1 and 4, the filter being removed and cleansed as often as may be required. It will however be readily understood that a filter cap may be applied over the mouth of the extension, $h^6$, of the treating chamber instead of covering the material being treated with a filter, $s$, and the same results obtained.

When the essential elements of the apparatus that come in contact with the dye liquor or any other liquor used, are made of metal which may be injuriously affected thereby and which may injuriously affect such liquors, said elements are coated with any suitable enamel.

The described apparatus may be used in conjunction with a pump for exhausting the receivers instead of a steam ejector or ejectors, but we prefer the latter as more economical and more effective than pumps and the like, which are expensive and take up too much space and are liable to speedy wear. If desired the treating chamber and the receivers and connected parts may be arranged beside the vat so that two such vats can be used, one on each side of the treating chamber and receivers, suitable connections being made with the treating chamber as well as provisions for returning the liquor from the receivers to the vat. On the other hand the said treating chamber, the receivers, and connections may be supported on separate stands above and at opposite ends of the vat, which latter can then be passed under said parts, which need not be disturbed when it becomes necessary to remove the vat.

Under some conditions of use, as for instance in bleaching fibrous materials, the small receiver, $f$, and its connections with the valve chest, E, may be dispensed with, and the ejector connected directly with the upper end of the large receiver, $b$, and in this case a modified construction of air valve chest, E', will be employed, or suitable means provided to admit air to the large receiver for the purpose of destroying the partial vacuum therein and returning the contents thereof back into the vat, $a$.

If the material after having been subjected to the action of the liquor in the vat is to be treated with air only, this can also be done by shutting the steam off from pipe, $n^{21}$, before the lever, $l$, is moved to the position, $l'$, when the cover, $h^3$, of the treating chamber may be lifted a little or thrown back to admit air freely thereto.

Having thus described our invention, what we claim as new therein, and desire to secure by Letters Patent, is—

1. In an apparatus of the class described, the combination of a vat, a treating chamber connected with said vat at a point intermediate of the bottom and upper edge thereof, an exhaust chamber containing an exhaust valve, and a perforated top closing the chamber on one side of the valve, said exhaust chamber being contained in the treating chamber above the level of the liquid in the vat, of a receiver, a duct leading from the lower part of the receiver to the exhaust chamber on the opposite side of the valve therein, a fluid ejector, a connection between the same and the upper end of the receiver for producing a partial vacuum therein, and a waste pipe connecting the ejector with the heater coil in the vat, for the purpose set forth.

2. In an apparatus of the class described, the combination of a vat, a treating chamber connected with said vat at a point intermediate of the bottom and upper edge thereof, an exhaust chamber containing an exhaust valve and a perforated top closing the chamber on one side of the valve, said exhaust chamber being contained in the treating chamber above the level of the liquid in the vat, of a receiver, a duct leading from the lower part of the receiver to the exhaust chamber on the opposite side of the valve therein, a fluid ejector, a connection between the same and the upper end of the receiver for producing a partial vacuum therein, and a waste pipe connecting the ejector with the heater coil in the vat, said waste pipe having a branch pipe connected thereto at a point outside of the vat, for the purpose set forth.

3. The combination of a vat, a heater coil therein, a treating chamber connected with the vat, an exhaust chamber within the treating chamber above the level of the liquid in the vat, a perforated cover for said exhaust chamber, a receiver, a connection between the lower end of the receiver and exhaust chamber, a steam ejector connected with the upper end of the receiver, and a pipe connecting the discharge of the ejector with the coil in the vat, substantially as and for the purpose set forth.

4. In an apparatus of the class described, the combination with a vat, and a treating chamber connected with said vat at a point intermediate of its bottom and upper edge, an exhaust chamber contained in the treating chamber, a perforated top for the exhaust chamber and two valved exhaust ducts leading from the last named chamber, of two receivers, $b$, and, $f$, a valved passage leading from receiver, $f$, to one of the exhaust ducts, an open passage leading from the lower part of receiver, $b$, to the other exhaust duct, a connection between the two receivers through the valved passage of receiver, $f$, a fluid ejector, and a connection between the same and the upper part of receiver, $f$, for the purpose set forth.

5. In an apparatus of the class described, the combination with a vat, a treating chamber connected with said vat at a point intermediate of the bottom and upper edge thereof, said treating chamber being provided with a cover and having a passage encompassing the upper edge thereof and communicating with the interior of the chamber, a valved pipe connected with said passage, an exhaust chamber contained in the treating chamber, a perforated cover for said exhaust chamber, and two valved passages, 3 and 4, leading from the last named chamber; of two receivers, $b$, $f$, a duct leading from the lower part of the receiver, $b$, to the duct, 3, an air valve chest having three ports, $e^2$, $e^4$, $e^3$, a valve, $e'$, co-operating with said ports and constructed to partially cover ports, $e^2$, $e^3$, when in its middle or normal position covering port, $e^4$, said valve having a cavity, $e^{21}$, a connection between port, $e^2$, and the upper end of receiver, $b$, a connection between port, $e^3$, and a duct leading to the passage 4 in the exhaust chamber, a connection between the port, $e^4$, and the interior of the small receiver, an ejector connected with the upper part of the last-named receiver, and means for supplying steam to the ejector and to the valved pipe leading to the passage around the upper end of the treating chamber, for the purpose set forth.

6. In an apparatus of the class described, the combination with the receivers, $b$, and $f$, the duct, $f^4$, and an ejector connected with the upper part of the receiver, $f$; of the air valve chest, E', having ports, $e^2$, $e^4$, $e^3$, the slide valve, $e'$, having cavity $e^{21}$, a connection between port, $e^4$, and the interior of the said receiver, $f$, a connection between port, $e^2$, and the upper part of receiver, $b$, and a connection between port, $e^4$, and duct, $f^4$, substantially as and for the purpose set forth.

7. In an apparatus of the class described, the combination with the receivers, $b$, and $f$, the duct, $f^4$, pipe, $k^a$, an injector in said pipe and an ejector connected with the upper part of receiver, $f$, an air valve chest having ports, $e^2$, $e^4$, $e^3$, the slide valve, $e'$, having cavity, $e^{21}$, connections between port, $e^4$, and the interior of receiver, $f$, port, $e^2$, and interior of receiver, $b$, and port, $e^3$, and duct, $f^4$; of a steam slide valve chest having ports, $m^5$, $n$, a slide valve controlling said ports and connections between port, $m^5$ and the ejector, and port, $n$, and the injector, for the purpose set forth.

8. In an apparatus of the class described, the combination with the receivers, $b$, and $f$, the duct, $f^5$, pipe, $k^a$, an injector in said pipe and an ejector connected with the upper part of receiver, $f$, of a slide valve chest divided into air and steam slide valve chests, the air valve chest having ports, $e^2$, $e^4$, $e^3$, respectively connected with the interior of receivers $b$ and $f$, and with duct, $f^4$, and a valve for controlling said ports, the steam valve chest having ports, $m^5$, and, $n$, and connections with the ejector and injector respectively, and a valve for controlling said ports, for the purpose set forth.

9. In an apparatus of the class described, the combination with the treating chamber, $h$, and the exhaust chamber therein, of a flexible exhaust valve, and a concavo-convex stop disk, $c^6$, secured to the stem of the valve, substantially as and for the purpose set forth.

10. The combination with the treating chamber, the exhaust valve chamber therein, and a portable cop or skewer table adapted to seat on said exhaust chamber, said table provided with bearings projecting from its under face and surrounded by an annular groove in the upper face of the table to form a boss, of skewers or cops removably seated in said bearings, said skewers or cops provided with an annular recessed packing flange and a packing seated therein and having bearing on the face of said bosses, for the purpose set forth.

11. In an apparatus of the class described, the combination with the valve, $k$, the slide valves, $e'$, $m^5$, and the mechanism for simultaneously actuating the said valves, of a recording mechanism controlled by the movements of the slide valve, $e'$, for the purpose set forth.

12. In an apparatus of the class described, the combination with the vat, $a$, the pipe, $k^a$, the injector, $n'$, in the end of said pipe, the steam slide valve, $m^5$, and the valve port, $n$, controlled thereby; of the pipe, $n^{21}$, connected with the injector and port, $n$, respectively, said pipe having a valved branch, $n^2$, extending into vat, $a$, substantially as and for the purpose set forth.

13. In an apparatus of the class described, the combination with the receiver, $f$, having a valved discharge pipe at its lower end, the duct, $f^4$, and the receiver, $b$; of the air valve chest having three ports, $e^2$, $e^4$, $e^3$, and a valve, $e'$, provided with a cavity, $e^{21}$, for controlling said ports, a connection between port, $e^4$, and a pipe, $g$, extending downwardly into receiver, $f$, and connections between ports, $e^2$, and $e^3$, the upper end of the receiver, and the duct, $f^4$, substantially as and for the purpose set forth.

GEORGE YOUNG.
WILLIAM CRIPPIN.

Witnesses:
G. A. HEIMENDAHL,
GEORGE HAHLO.